United States Patent Office 3,352,768
Patented Nov. 14, 1967

3,352,768
ACETYLENE DICARBOXYLIC ACID PROCESS
Leon Katz, Springfield, N.J., and Max E. Chiddix, Easton, Pa., assignors to General Aniline & Film Corporation, New York, N.Y., a corporation of Delaware
No Drawing. Filed June 3, 1964, Ser. No. 372,410
7 Claims. (Cl. 204—79)

This invention relates to the production of acetylene dicarboxylic acid by electrolytic oxidation of 2-butynediol-1,4 and more particularly to an improved process for the recovery of acetylene dicarboxylic acid so produced.

It is known in the art that acetylene dicarboxylic acid can be prepared by electrolytic oxidation of acidic solutions of 2-butynediol-1,4. Although the electrolytic oxidation gives 70 to 80% yields of acetylene dicarboxylic acid, its recovery and purification has presented a number of problems necessitating the use of complicated and expensive techniques. Thus U.S. Patent 2,786,022 suggests its recovery by extraction with diethyl ether. However, acetylene dicarboxylic acid is very soluble in the dilute sulfuric acid solution used in the electrolytic process, as well as in the diethyl ether employed in the extraction of the acid from the reaction mixture. It has, therefore, been the practice to "salt" the electrolytic reaction mixture to improve the efficiency of the extraction. Normally, salting is accomplished by adding an excess of sodium chloride to the reaction mixture. Addition of sodium chloride to the electrolytic reaction mixture makes it unsuitable for reuse in the process, so the reaction mixture, after salting, and extracting, must be discarded. The salted and extracted reaction mixture contains some acetylene dicarboxylic acid so reuse of this mixture would effect further economies in the process. Use of diethyl ether in this process has further disadvantages. The diethyl ether extracts from this process dissolve or entrain a portion of aqueous acidic reaction mixture. It is necessary to dry the ether extracts with a desiccant such as anhydrous calcium chloride. When solid desiccants are used, the desiccant must be removed from the ether extract by filtration and must be washed with ether. Removal of the desiccant is both time consuming and uneconomical. Diethyl ether has the added disadvantage that it is a highly inflammable liquid. It has a flash point of less than 20° F. Special equipment must be used when diethyl ether is employed in commercial operations and special precautions must also be taken because of the highly flammable nature of this solvent. Diethyl ether also forms explosive peroxides by contact with air.

It is the object of the present invention to provide an improved electrolytic oxidation process for the manufacture and recovery of acetylene dicarboxylic acid. A further object is to provide a continuous electrolytic oxidation process for the manufacture of acetylene dicarboxylic acid. Other objects and advantages of this invention will appear as this description proceeds.

The attainment of the objects of this invention is made possible by the discovery of an improved process for the manufacture of acetylene dicarboxylic acid. The improvement in this invention involves the use of water insoluble ketones or esters as solvents in the extraction of acetylene dicarboxylic acid from acidic reaction mixtures obtained in electrolytic oxidations of 2-butynediol-1,4. It is found that use of these water insoluble solvents instead of diethyl ether in the electrolytic oxidation process eliminates salting of the reaction mixture with salts such as sodium chloride to depress the solubility of acetylene dicarboxylic acid, use of solid desiccants in the drying of the extracts and filtration of solid desiccants from these extracts. These water insoluble solvents also provide other advantages. They permit reuse or recycle of electrolytic oxidation reaction mixtures after extraction of acetylene dicarboxylic acid. Reuse of these mixtures effects further economies in the electrolytic process which are not possible in the electrolytic process previously used, where the salts added during salting adversely affect the electrolytic properties of the reaction mixture and preclude its reuse.

We have found that water insoluble ketones having from 4 to 10 alkyl carbon atoms and water insoluble esters of monocarboxylic alkanoic acids of from 2 to 6 carbon atoms with alkanols of 1 to 6 carbon atoms are satisfactory when employed in the practice of the present invention. We prefer those water insoluble ketones and esters having boiling ranges of from about 100 to 180° C. at atmospheric pressure in order that they may be readily recovered and purified for reuse by simple distillation. Such ketones include diethyl ketone, methyl isobutyl ketone, diisopropyl ketone, ethyl n-butyl ketone, methyl n-amyl ketone, diisobutyl ketone, methyl n-butyl ketone, ethyl propyl ketone, dipropyl ketone, methyl s-butyl ketone, methyl n-propyl ketone, their mixtures, their isomers or the like. Examples of preferred water insoluble esters which may be employed in this invention include t-butyl acetate, t-butyl propionate, s-butyl acetate, isobutyl acetate, isopropyl acetate, ethyl n-butyrate, n-butyl acetate, isoamyl acetate, n-amyl acetate, isoamyl propionate, isoamyl n-butyrate, methyl pivalate, their isomers, their mixtures or the like. It is to be understood that mixtures of these ketones and esters may also be employed.

It is found that when these water insoluble ketones or esters are employed in the practice of this invention that acetylene dicarboxylic acid can be readily removed from the acidic electrolytic reaction mixtures by extraction without salting the reaction mixtures with sodium chloride. It is also found that extracts can be dried by azeotropic distillation and that the use of solid desiccants can be eliminated. Since sodium chloride or other salts are not added to the electrolytic reaction mixture to salt out the acetylene dicarboxylic acid, the reaction mixture can be reused or recycled in a subsequent electrolytic oxidation. This permits development of continuous processes for the electrolytic oxidation of 2-butynediol-1,4.

Briefly, the process for manufacture of acetylene dicarboxylic acid by electrolytic oxidation involves electrolysis of an aqueous solution of 2-butynediol-1,4 in an electrolyte such as sulfuric acid. The oxidation occurs at the anode. The process is usually carried out in an electrolysis cell in which the anode and the cathode are in separate compartments, i.e. the anode is separated from the cathode by a semipermeable diaphragm so that the solution in the anode compartment does not mix readily with the solution in the cathode compartment.

The solution in the anode compartment is called the anolyte and is usually a solution of 2-butynediol-1,4 in sulfuric acid and distilled water. The solution in the cathode compartment is called the catholyte and is usually a solution of sulfuric acid in distilled water. The sulfuric acid concentration in these two solutions may be from 1 to 40% by weight of the solution. Since the oxidation occurs at the anode, 2-butynediol-1,4 is added to the anolyte. The concentration of 2-butynediol-1,4 in the anolyte may be from 1 to 35% by weight of the solution. Concentrations of 2-butynediol-1,4 from about 4 to 12% by weight in solutions containing from 7.5 to 15% sulfuric acid are particularly useful in the process disclosed by this invention.

The electrolytic oxidation may be carried out at temperatures in the range from about −10 to 50° C. Electrolytic oxidation is effected by applying sufficient electrical current energy to the anolyte to oxidize 2-butynediol-1,4 to acetylene dicarboxylic acid. A total of 8 faradays are required to oxidize 1 mole of 2-butynediol-1,4 to acetylene dicarboxylic acid. The actual amount of current energy required for this oxidation may range from 100 to 260% of the theoretical value. Current density is the electrical current flowing through the electrode divided by the surface area of the electrode and may be expressed as amperes per square centimeter (amp./cm.$^2$). The anode current densities usually employed in this oxidation may vary from about 0.01 to 0.25 amp./cm.$^2$. The time required to pass sufficient electrical current through the anolyte to effect a theoretical 100% oxidation (theoretical 100% efficiency) of 2-butynediol-1,4 to acetylene dicarboxylic acid may be calculated from the following equation.

$$\text{Time (hours)} = \frac{\text{wt. butynediol (g.)}}{\text{mol. wt. butynediol}} \times \frac{8 \text{ faradays} \times 96{,}500 \text{ coulombs/faraday}}{\text{amperes} \times 3600 \text{ seconds/hour}}$$

The number of hours required for this oxidation may then be calculated using the values for amperage and weight of butynediol which are employed in the oxidation:

$$\text{Hours required for oxidation} = \frac{\text{wt. butynediol (g.)}}{\text{amperes}} \times \frac{2.49 \text{ ampere hrs.}}{\text{gram}}$$

The electrolysis cells for this process may be constructed of conventional materials. Advantageously, copper electrodes are used as the cathodes and lead electrodes for the anodes. These metals may be used in the form of sheet, screen, wire, tubing, pipe or other shapes. If desired, these electrodes may be designed so they can be rotated during the electrolysis. If desired, a lead walled container may be used as the anode. The semipermeable diaphragm may be constructed of any porous material which is not adversely affected by sulfuric acid or the conditions under which this process is carried out. Suitable porous materials include Alundum, ceramic, clay, porcelain, glass or the like. Since heat is produced during the oxidation, adequate provisions for either external or internal cooling are provided.

Normally the electrolytic oxidation is carried out at temperatures from about −10 to 10° C. When oxidation is complete, the anolyte is extracted with the desired ketone or ester to remove acetylene dicarboxylic acid from the sulfuric acid. The extract containing the dicarboxylic acid is separated from the anolyte and the solvent (ketone or ester) is vaporized at temperatures from about room temperature to 100° C. leaving the acetylene dicarboxylic acid in the form of a solid product. Often the solvent is removed under reduced pressures at temperatures between room and 50° C.

The following examples illustrate preferred embodiments of the present invention. These examples are only illustrative and are not to be regarded as limitative. It is to be understood that all parts, percentages and proportions referred to herein and in the appended claims are by weight unless otherwise indicated.

*Example 1*

In an electrolytic cell consisting of a lead walled cylindrical container of 1.7 liter capacity (anode area=500 cm.$^2$) is placed a porous ceramic cup of 500 ml. capacity containing as the cathode a cylindrical coil of copper tubing through which a refrigerated glycol coolant is circulated. To the cathode compartment is charged 543 g. of 37% aqueous sulfuric acid and to the anode compartment 1121 g. of 16% aqueous sulfuric acid containing 130 g. of 2-butynediol-1,4. The electrolytic cell is placed in a refrigerated water-glycol bath at 5° C.

The electrodes are connected to a source of direct current and a voltage of 4.2 is applied across the cell establishing a current flow of 25 amperes. This corresponds to a current density of 0.05 amps./cm.$^2$ on the lead anode. The reaction is continued for 24.5 hours while the temperature of the anolyte is held at 8° C. During this period the amperage decreases to 10 and the voltage drops to 3.5. The anode potential measured against a saturated calomel electrode is 1.7 volts initially and increases to 2.0 volts during the reaction. The total current passing through the cell is approximately a 30% excess over the theoretical amount required for complete conversion of the butynediol to acetylene dicarboxylic acid.

The electrolytic reaction mixture weighing 1104 g. is siphoned out of the anode compartment of the cell for product recovery. This anolyte solution is extracted four times in a separatory funnel with methyl isobutyl ketone in successive portions as follows: 600 ml., 300 ml., 100 ml., and 100 ml. The ketone extracts are combined and the ketone removed by distillation from a rotating glass flask at 30–45° C. and under a pressure of 2 mm. of mercury. Toward the end of this distillation the product separates from the ketone as a white crystalline precipitate. Upon complete removal of the ketone, 136 g. of crystalline acetylene dicarboxylic acid melting at 177–179° C. is recovered. Titration of this product with standard sodium hydroxide shows an assay of 98%.

*Example 2*

The general procedure of Example 1 is repeated starting with an anolyte solution of 1680 g. of 16% H$_2$SO$_4$ containing 195 g. of butynediol. After the electrolytic oxidation is completed, the anolyte solution is removed from the cell and extracted with methyl isobutyl ketone as described in Example 1. The ketone solution of product weighs 1570 g. and is divided into two equal portions. The second portion is dried over 157 g. of anhydrous calcium chloride for 16 hours. The calcium chloride is removed by filtration and is washed with 195 g. methyl isobutyl ketone. This ketone wash solution is added to the filtrate. After removing the ketone by distillation, 89 g. of acetylene dicarboxylic acid, M.P. 174° C., is recovered. This is 66.2% of the theoretical yield. The ketone is removed from the first portion without drying over CaCl$_2$ and a recovery of 99 g. of product, M.P. 172° C. (73.7% yield) is obtained.

*Example 3.—Extraction with ether for comparison*

The general procedure of Example 1 was followed up to the extraction step starting with 25 g. of butynediol, 90 g. of H$_2$SO$_4$, and 510 g. of water. After completing the oxidation, sodium chloride is added to saturate the anolyte solution, and hydrochloric acid is released.

The solution is then filtered and extracted by shaking in a separatory funnel with six 100 ml. portions of diethyl ether. The ether extracts are combined and dried over 80 g. of anhydrous CaCl$_2$. The ether is removed by distillation from a water bath at 30° C. and 25 mm. mercury pressure. A total of 22.3 g. of acetylene dicarboxylic acid, M.P. 175° C. (66.5% yield) is recovered. The acidic reaction solution which remains must be discarded since much of the sulfuric acid has been converted to sodium sulfate and hydrochloric acid.

*Example 4*

The general procedure of Example 1 is repeated up to the extraction step starting with 938 g. of an anolyte solution containing 15% H$_2$SO$_4$ and 4% butynediol. After the oxidation is complete, the anolyte solution is extracted with six successive portions of isopropyl acetate. The combined isopropyl acetate extracts are heated at 25–50° C. under a pressure of 50 mm. of mercury to distill off the solvent. When removal of the solvent is complete, 32 g. of acetylene dicarboxylic acid, M.P. 169–170° C., remain. The yield is 64.4%.

*Example 5*

The procedure of Example 4 is repeated using the same charge and using isobutyl acetate in place of isopropyl acetate. After removal of the solvent at 25–30° C./20 mm. Hg, 37.3 g. of acetylene dicarboxylic acid, M.P. 175–177° C., remain for a 75% yield.

Example 6

In an electrolytic cell consisting of a sheet-lead anode placed around the walls of a 4-liter beaker is placed a porous ceramic cup containing a copper cathode prepared from copper tubing and a 15% sulfuric acid electrolyte. To the anode compartment is charged a solution made up of 2200 ml. of distilled water, 96 g. of 2-butynediol-1,4, 350 g. concentrated sulfuric acid. The concentration of butynediol in this anolyte solution is 4% by weight. This cell is placed in a refrigerated water-glycol bath at 0° C. and the electrodes are connected to a source of direct current. Current is passed through the cell for 41.5 hours at 4.8 volts with an average amperage of 9.55. Based on the inner surface of the sheet-lead anode, the current density is 0.035 amp./cm.$^2$. The total current is 162% of that theoretically required to oxidize all of the butynediol to acetylene dicarboxylic acid. The temperature averages 4° C. during the run. The anolyte solution is withdrawn and extracted five times with 400 ml. portions of methyl isobutyl ketone. All the ketone extracts are combined and the ketone removed by a distillation from a water bath at 50° C. and under a pressure 4 mm. of mercury. A residue of 98 g. of crystalline acetylene dicarboxylic acid melting at 172–3° C. remains in the flask (77% of the theoretical yield). The extracted sulfuric acid anolyte solution is then heated to 50° C. under pressure of 4 mm. of Hg to remove traces of the ketone used for extraction.

To this recovered sulfuric acid solution is added 96 g. of butynediol and the solution placed in the anode compartment of the electrolytic cell. The cathode solution is replaced with fresh 15% sulfuric acid electrolyte. The above procedure is repeated using a voltage of 4.5 and an average amperage of 9.35. The temperature of the anolyte solution is maintained at 2–3° C. The product is extracted with ketone in the same way and 96 g. of acetylene dicarboxylic acid is recovered (75% yield). The extracted sulfuric acid electrolyte is again heated under vacuum to remove traces of ketone.

The recovered sulfuric acid solution is again reused by adding 96 g. of butynediol and repeating the above electrolysis procedure. An average of 9.5 amperes of current is passed through the cell at 5 volts and the temperature held at 3–6° C. during the 41 hours reaction period. This corresponds to 160% of the theoretical current required to convert the butynediol to acetylene dicarboxylic acid. After removal of the methyl isobutyl ketone from the combined extracts 101 g. of acetylene dicarboxylic acid melting at 177° C. is recovered (79% yield).

Example 7

The general procedure of Example 1 is repeated up to the extraction step starting with 1121 g. of 16% $H_2SO_4$ containing 130 g. of butynediol. The electrolyzed solution is extracted 4 times in a separatory funnel with 400 ml. portions of methyl n-propyl ketone. The ketone is removed from the combined extracts by distillation at 20° C./30 mm. Hg to obtain 130 g. of acetylene dicarboxylic acid.

Example 8

The procedure of Example 7 is repeated using diisobutyl ketone in place of methyl n-propyl ketone. The diisobutyl ketone is removed at 100° C./90 mm. of Hg to obtain 138 g. of crystalline acetylene dicarboxylic acid.

Example 9

The procedure of Example 7 is repeated substituting n-propyl acetate for methyl n-propyl ketone. The n-propyl acetate is removed from the combined extracts at 50° C./120 mm. of Hg to yield 130 g. of acetylene dicarboxylic acid.

Example 10

The procedure of Example 7 is repeated using isopropyl acetate in place of methyl n-propyl ketone. After removing the isopropyl acetate at 40° C./120 mm. of Hg, 128 g. of acetylene dicarboxylic acid remains.

Example 11

The procedure of Example 7 is repeated with n-butyl acetate in place of methyl n-propyl ketone. After removing the n-butyl acetate from the combined extracts at a temperature of 50° C. and a pressure of 45 mm. of Hg, a total of 140 g. of crystalline acetylene dicarboxylic remains.

Example 12

The procedure of Example 7 is repeated using methyl propionate in place of methyl n-propyl ketone. The solvent is removed by distillation at 90 to 100° C. at atmospheric pressure leaving 125 g. of acetylene dicarboxylic acid in the residue.

Example 13

The procedure of Example 7 is repeated using n-butyl propionate in place of methyl n-propyl ketone. The n-butyl propionate solvent is removed by distillation at 50° C./20 mm. of Hg to give 133 g. of acetylene dicarboxylic acid melting at 175–176° C.

Example 14

The general procedure of Example 1 is repeated using 1120 g. of 7.5% sulfuric acid anolyte solution containing 222 g. of 2-butynediol-1,4. After the electrolysis is complete there is recovered from the anolyte solution by extraction with methyl isobutyl ketone 223 g. of acetylene dicarboxylic acid melting at 174–6° C. (75% yield). The temperature during this reaction is controlled at 15° C.

Example 15

The procedure of Example 1 is repeated using an anolyte solution of 10% sulfuric acid containing 220 g. of butynediol. During the electrolysis the temperature of the anolyte solution is held at 10–12° C. The anolyte solution is extracted with methyl isobutyl ketone recovering 225 g. of acetylene dicarboxylic acid, M.P. 175–7° C.

The foregoing examples demonstrate an improved process for manufacture of acetylene dicarboxylic acid. The product of this invention is particularly useful as a corrosion inhibitor, as an additive in bright nickel plating baths and in copper electroplating baths, as a modifier to the improvement of adhesion of polyethylene to surfaces of dissimilar materials, as a crosslinking agent for vinyl polymers, as an adduct in diene syntheses such as in the Diels Alder syntheses and in numerous other applications.

This invention has been disclosed with respect to certain preferred embodiments. Various modifications and variations thereof will become obvious to persons skilled in the art. It is to be understood that such modification and variations are to be included within the spirit and the scope of this invention.

What is claimed is:

1. In a process for producing acetylene dicarboxylic acid wherein 2-butynediol-1,4 is electrolytically oxidized in an aqueous sulfuric acid solution and the dicarboxylic acid is recovered from the sulfuric acid solution; the improvement which comprises contacting the sulfuric acid solution after oxidation with a water insoluble organic solvent boiling in the range of from 100 to 180° C. at atmospheric pressure selected from the class consisting of esters and ketones to extract the acetylene dicarboxylic acid from the sulfuric acid solution, separating the solvent containing the dicarboxylic acid from the sulfuric acid solution and recovering the dicarboxylic acid from the solvent by vaporization to thereby improve the efficiency of the process, to eliminate salting of the sulfuric acid solution, to eliminate drying of the solvent containing extract and to permit reuse of the sulfuric acid solution in a subsequent oxidation.

2. A process as defined in claim 1 wherein the organic solvent used is diethyl ketone.

3. A process as defined in claim 1 wherein the organic solvent used is methyl isobutyl ketone.

4. A process as defined in claim 1 wherein the organic solvent used is diisobutyl ketone.

5. A process as defined in claim 1 wherein the organic solvent used is isopropyl acetate.

6. A process as defined in claim 1 wherein the organic solvent used is isoamyl acetate.

7. A process as defined in claim 1 wherein the organic solvent used is isoamyl n-butyrate.

References Cited

UNITED STATES PATENTS

| 2,786,022 | 3/1957 | Wolf | 204—79 |
| 2,848,490 | 8/1958 | Niebling et al. | 260—537 |

FOREIGN PATENTS

| 767,041 | 1/1957 | Great Britain. |
| 792,487 | 3/1958 | Great Britain. |
| 813,842 | 5/1959 | Great Britain. |

JOHN H. MACK, *Primary Examiner.*

H. M. FLOURNOY, *Assistant Examiner.*